United States Patent

[11] 3,555,950

| [72] | Inventors | Thomas Gerardus Gijsbers;<br>Leopold Michael Lambert Joseph Leblans;<br>Henricus Petrus Cornelis Daniels,<br>Emmasingel, Eindhoven, Netherlands |
|---|---|---|
| [21] | Appl. No. | 831,474 |
| [22] | Filed | June 9, 1969 |
| [45] | Patented | Jan. 19, 1971 |
| [73] | Assignee | U. S. Philips Corporation<br>New York, N.Y.<br>a corporation of Delaware |
| [32] | Priority | June 8, 1968 |
| [33] | | Netherlands |
| [31] | | 6808110 |

[54] APPARATUS FOR CUTTING A DRAWING IN A LAYER OF SYNTHETIC MATERIAL
8 Claims, 4 Drawing Figs.

[52] U.S. Cl. .................................................. 83/171,
83/8, 83/925
[51] Int. Cl. .................................................. B26d 7/10

[50] Field of Search ........................................... 83/171, 6,
8, 1, 16

[56] References Cited
UNITED STATES PATENTS

| 1,447,730 | 3/1923 | Post .............................. | 83/6X |
| 3,183,339 | 5/1965 | Lins .............................. | 83/16X |
| 3,396,616 | 8/1968 | Wright .......................... | 83/171X |
| 3,469,479 | 9/1969 | Calemard ..................... | 83/171X |

Primary Examiner—Frank T. Yost
Attorney—Frank R. Trifari

ABSTRACT: In manufacturing patterns such as photomasks, contours are cut in a foil by means of a cutting tool, after which the material of the foil situated inside or outside the contours is removed. According to the invention, a cutter is used which is preferably rotationally symmetrical, the cutting part of which extends at right angles to the plane of the foil and is heated during cutting of the foil to facilitate the cutting operation. Any contours may be cut by means of this tool which is insensitive to the direction of cutting.

APPARATUS FOR CUTTING A DRAWING IN A LAYER OF SYNTHETIC MATERIAL

The invention relates to a method and apparatus of providing a pattern in a multilayer plate in which one of the outermost layers is formed by a foil of synthetic material, which plate is used, for example, in manufacturing photomasks in which contours are cut in the foil in question by means of a cutting tool and the part of the foil situated inside or outside said contours is them removed. Such a method is known and is used, for example, for producing drawings for the manufacture of photomasks.

In the known method a multilayer plate is used, in which one of the layers forms a transparent substrate of synthetic material on which another layer is secured which likewise consists of a synthetic material and is formed as a foil which is less transparent or even quite opaque. In this method, a contour is cut in the foil by means of a sharp chisel, the cutting surface of which has an inclined angle with respect to the foil, after which the material of the foil present inside or outside the said contours is removed and a desired contrasting pattern is thus obtained.

The drawback of the known method is that it is suitable only for providing geometrically simple figures or patterns which consist, for example, of only straight lines or circles and in which even special auxiliary tools are necessary for providing circles. All this is due to the fact that the known chisel has only one direction of cutting and hence is dependent upon the direction of cutting. So by means of said known chisel it is not possible to cut a curve of any shape and good quality in one uninterrupted movement of cutting. When for example, a bent line is to be cut, it is necessary to align the chisel on the first part of the bent line to remove the chisel from the foil, upon reaching the bend in the line, to align it again with respect to the other part of the line adjoining said bend, only after which the chisel can be made to contact the foil again and the second line section can be cut. In order to make the associated laborious handling with the cutting tool practicable, it is ensured in practice, in designing a pattern to be cut, that the contour line extends preferably only in two main directions, for example 90° shifted with respect to each other. For the designer of the photomask to be manufactured, these are annoying limitations.

It is the object of the invention to provide a method which enables a cutting line to be provided of any shape in one uninterrupted cutting operation so that the above-mentioned restrictions need no longer be taken into account.

For that purpose the method according to the invention is characterized in that the cutting tool has an entirely or substantially entirely symmetrical shape on at least its cutting part projecting through the foil with respect to the main axis passing through the tips of the cutting part and the foil is heated during the cutting operation at least on or in the immediate proximity of the cutting place by means of an external heating source. It has been found that, by using the method according to the invention, a very sharply limited line pattern can be provided in a foil of synthetic material in spite of the fact that the material of the foil is softened to some extent and that one might expect actually that with a cutting tool projecting in this slightly softened foil no sharp curve can be obtained.

So in the method according to the invention a cutting tool is used the cutting part of which preferably has a rotational symmetrical shape in contrast with the chisel used in the known method. It has been found that by heating the foil at the place to be operated a good cutting quality can be obtained with a cutting tool which can be drawn through the foil according to any contour line in one uninterrupted movement. The method and apparatus according to the invention is excellently suitable for use, for example, in automatically controlled drawing machines, because the direction is no longer restricted by the design of the cutting part of the tool. In this case of the cutting tool is preferably arranged so that the main axis of the cutting part of the cutting tool extends at right right angles to the surface of the foil during cutting.

By using the method according to the invention it appears to be possible to choose the distance between the two adjacent contour lines to be particularly small over a reasonable length, for example 0.2 mm., which can hardly be realized in a reproducible manner with the chisel according to the known method.

It has furthermore been found that particularly good cutting results can be obtained when the cutting part itself is heated and, due to the contact with the foil, transmits heat to the material of the foil. The question to what temperature the cutting part has to be heated to obtain optimum cutting qualities of course also depends upon the material of the foil used, and should be established empirically for each individual case. By way of example it may be stated that said temperature is approximately 170° C. for the foil materials known commercially as "Stabilene" and "Studnite" which are frequently used for the manufacture of photomasks.

The heating of the cutting part of the cutting tool may be carried out electrically. If desirable, heating may be effected by means of heat which is generated, for example, by vibrations exerted ultrasonically on the cutting part.

Although in principle, the cutting part projecting through the foil may consist of any other hard and to some extent refractory material, it is recommendable in the method according to the invention to use diamond as a cutting material. It has been found that this material has a good chemical resistance with respect to the conventional foil materials used for photomasks.

The invention also provides a device for carrying out the method. According to an embodiment of this device which comprises a table and a cutting tool arranged in a holder so as to be movable with respect to said table, in which the holder may be controlled with respect to the table, the holder comprises a foot which can be moved over the surface of the table and has a central aperture through which the cutting part of the cutting tool projects in the axial direction thereof over an adjustable distance, and furthermore means are provided for heating the cutting part of the tool.

In order that the invention may be readily carried into effect, it will not be described in greater detail, by way of example, with reference to the accompanying drawings, in which:

FIG. 1 and 2 serve to illustrate the known method of providing a mask pattern in a multilayer plate;

Figure 1:
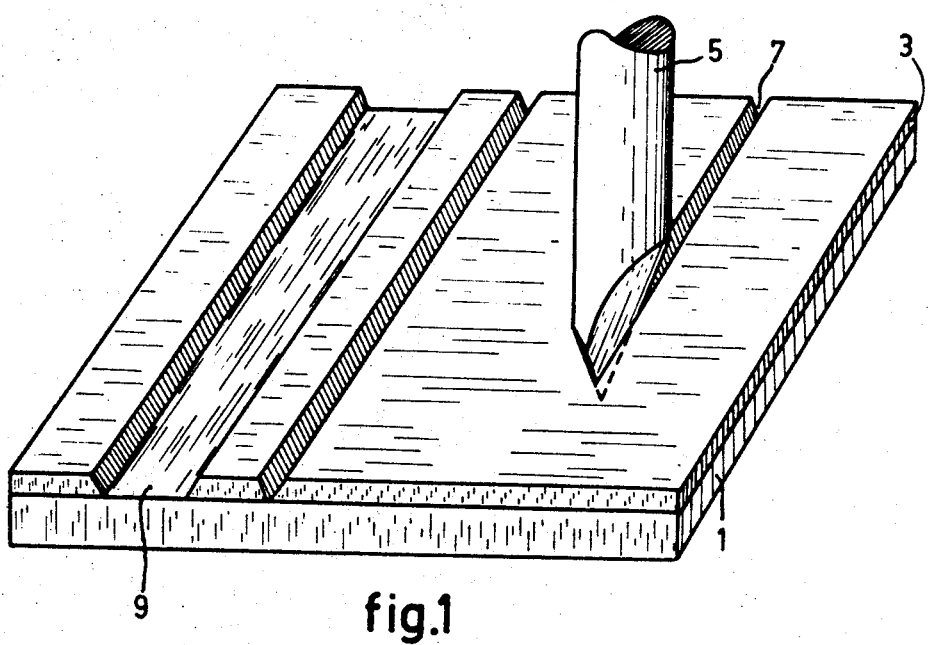

In the manufacture of photomasks it is common practice to use a multilayer flexible plate of a synthetic material which, as shown in FIG. 1, is constituted as a foil 1 of synthetic material serving as a flexible transparent substrate on which is secured another foil of synthetic material 3 formed as a less transparent or even entirely opaque layer. For this purpose are to be considered the conventional multilayer materials, for example, obtainable commercially as "Stabilene" and "Studnite."

Figure 2:
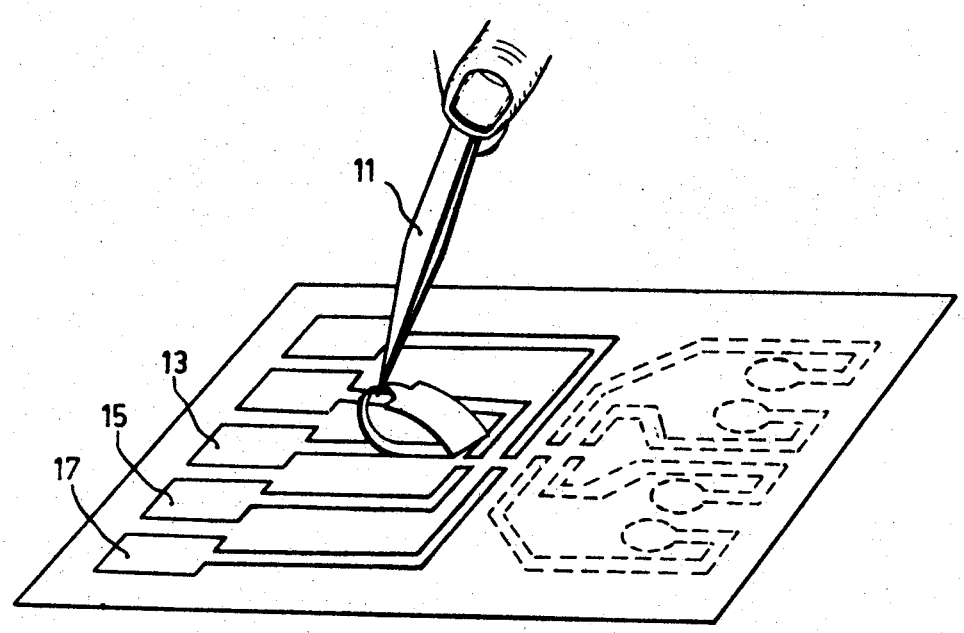

In manufacturing such a photomask, a drawing is produced on an enlarged scale and is reduced afterwards photographically. This drawing is provided in the uppermost foil 3 of the multilayer plate by means of a sharp tool shown as a chisel 5. This chisel comprises a narrow cutting edge, which projects through the foil and produces a very narrow groove or contour line 7 in said foil. After a number of grooves have been provided in said foil according to a given pattern, the part of the foil remaining between two adjacent cuts or the part of the foil 3, situated beyond said cuts, are removed from the substrate 1 so that a contrasting picture is obtained. In FIG. 1 this is shown as the track 9. It is shown in FIG. 2 how the cut part of the foil present between the contour lines is removed from the substrate 1 by means of tweezers 11 so that the transparent parts 13, 15 and 17 are revealed. Also because in this known method a chisel 5 is used which is strongly dependent upon the direction of cutting, it is ensured in designing a drawing of the pattern to use in principle only contour lines which extend at right angles to each other. For each of the lines to be cut, the cutting edge of the chisel 5 used must b be removed from the foil, be aligned with respect to the next line section, after which this line section can be cut. Actually, the cutting part of the chisel 5 is highly sensitive to the direction of cutting.

In the method according to the invention a cutting tool of a slightly different shape is used. This cutting tool comprises a holder 19 which at its lower end is formed as a guide foot 21. In this holder 19 a pin 29 is arranged so as to be adjustable axially by means of an adjusting screw 23, pin 25 and adjusting screw 27, the pin 25 cooperating with a helically extending surface 31 of a ring 33. A tubular ceramic portion 35 which has a conical copper part 37 to which a diamond cutting part 39 is brazed, is secured to said pin 19. This cutting part extends with its main axis at right angles to the plane of the foil 3, and is constituted so that a cross section over this part near the cutting tip and parallel to the surface of the foil shows an entirely or substantially entirely rotational symmetrical shape. This cutting part extends through an aperture 41 present in the foot 21 over a distance which has previously been adjusted, to just in the lower foil 1.

The cutting part 39 is furthermore heated by an external heating source. For this purpose, the part 37 comprises a shank 43 in which a heating element 45 is arranged which is connected to pins 51 and 53 by means of current conducting wires 47 and 49, which pins are connected to a voltage source not shown. In this manner a cutting tool is obtained which is highly independent of the direction of cutting with respect to the foil of synthetic material to be cut, when the cutting tip is given a suitably chosen temperature. The temperature at which optimum cutting results are obtained, mainly depends upon the foil material chosen and is to be determined empirically. In the foil materials tested in this case and obtainable as "Stabilene" and "Studnite," which materials are frequently used for the manufacture of photomasks, the said temperature in both cases was approximately 170° C.

When the described heated cutting tool is drawn through the foil 3 with its longitudinal dimension at right angles to the plane of the foil 3, it is found that the cutting part 39 is not sensitive to the direction of cutting, so that a contour line can be cut in one uninterrupted movement, in which the variation of said line may be very fanciful. So in designing a drawing, the designer of a pattern has one degree of freedom more available and he is no longer limited to lines extending only at right angles to each other. In FIG. 2, an example of a part of an imaginary pattern which can simply be obtained by the method according to the invention is shown on broken lines.

Figure 4:
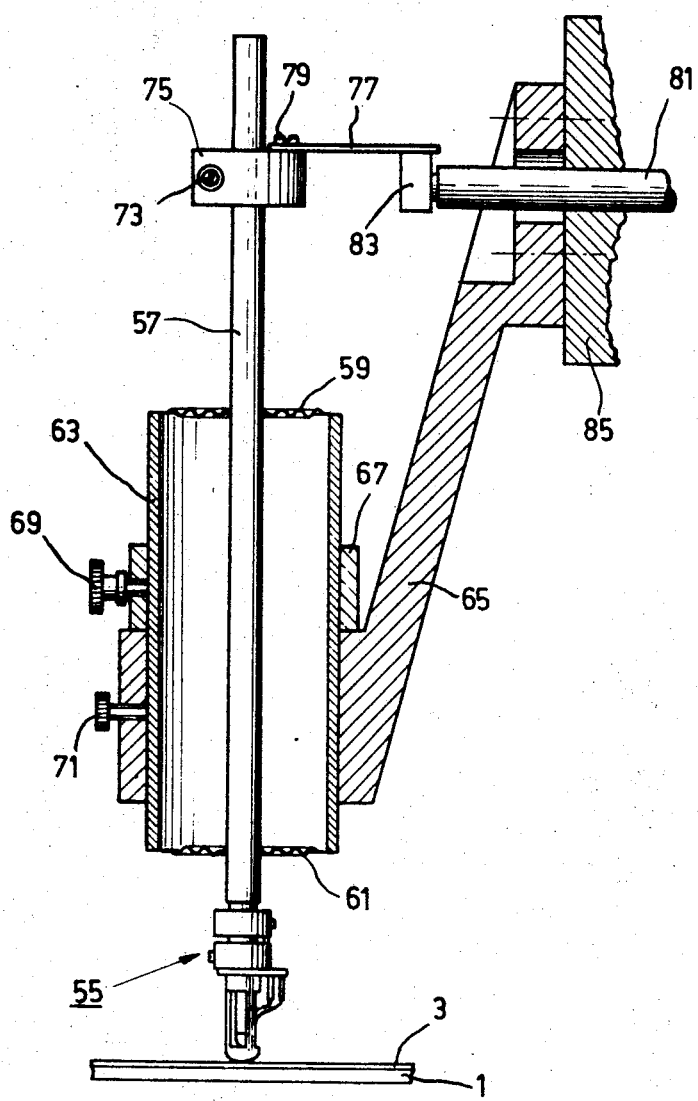
FIG. 4 is a diagrammatic cross-sectional view of a part of an automatically controlled drawing machine in which the tool shown in FIG. 3 is incorporated.
Figure 3:
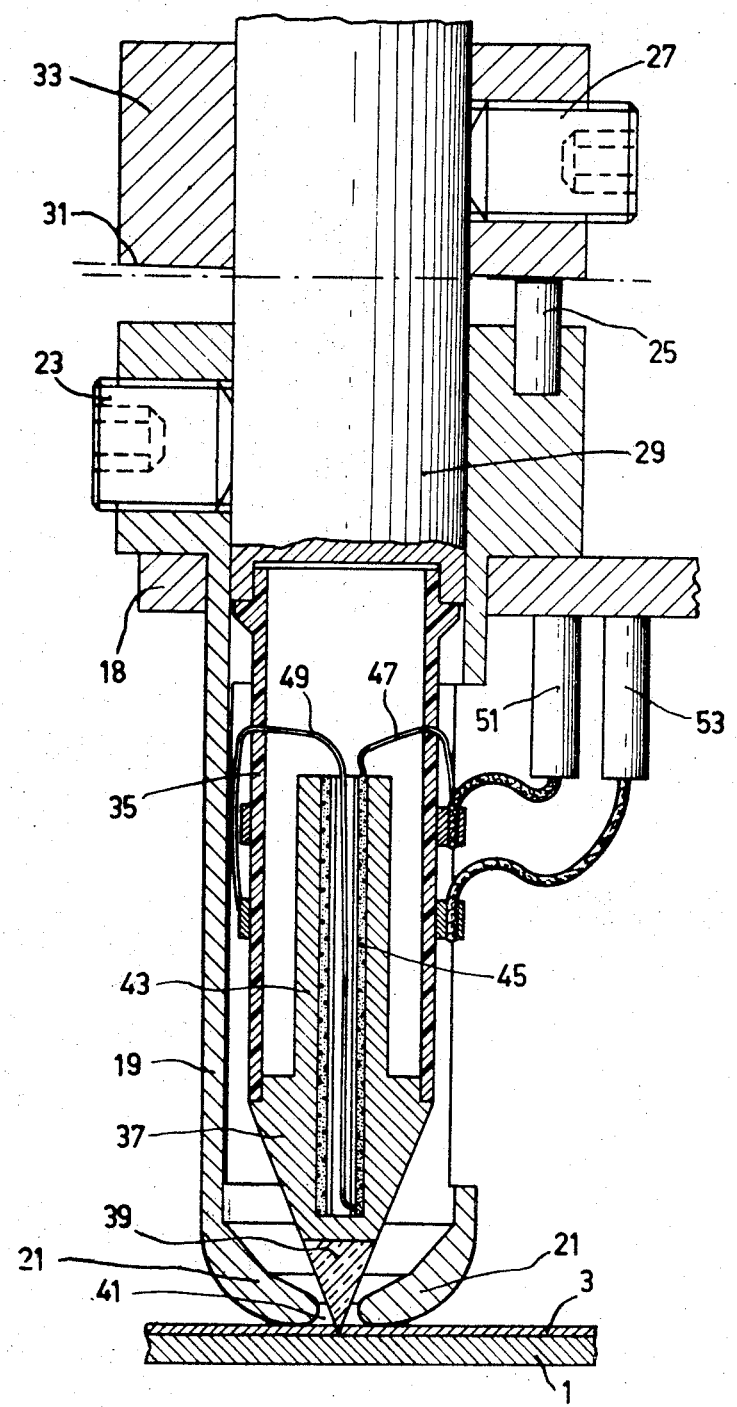
FIG. 3 shows the cutting tool used in the method according to the invention.

FIG. 4 is a diagrammatic representation of a part of a numerically controlled drawing machine, in which the above-described cutting tool is incorporated and is denoted by 55. This cutting tool 55 is secured to the end of a shaft 57 which is coupled at two places to diaphragms 59 and 61 which are incorporated themselves with their outer circumference in a housing 63. This housing 63 is secured in an arm 65 of a drawing machine, which arm is movable as programmed control in a manner not shown in a plane parallel to the plane of the foil 3. The connection in the arm 65 is carried out by means of an adjusting ring 67 and adjusting screws 69 and 71. The shaft 57 furthermore supports an adjusting ring 75 secured by means of a screw 73, on which a leaf spring 77 is secured by means of screw 79. This leaf spring 77 freely bears on the upper side of an eccentric disc 83 secured to a rotatable shaft 81. The shaft is rotatably journaled in a slide 85 which supports the arm 65. By rotating the shaft 81, the tool 55 can be displaced in the direction of its height relative to the foil 3. All adjusting means are furthermore adjusted with respect to each other in such manner that during normal use of the drawing machine, the cutting part 55 engages the upper surface of the foil 3 to be cut with a given preload, so that the possibility is presented, particularly in the case of a somewhat less flat substrate, to move the foot somewhat up and down without the pressure force exerted by said foot on the foil varying noteworthily.

As described above, an electric heating may be used for heating the cutting part 39. It will be obvious that the cutting part 39 may also be heated differently. For example, it has been found possible to use heat which is produced by vibrations exerted ultrasonically on the cutting part 39.

We claim:

1. An apparatus for providing a pattern in a multilayer plate for use in the manufacture of photomasks, the outermost layer of said plate being a foil of synthetic material, said apparatus comprising a table for supporting said plate, a cutting tool supported in movable relation with respect to said table for cutting said pattern, means for supporting said cutting tool and controlling its movement with relation to said table, said cutting tool comprising a holder, a foot member connected to said holder having a central aperture therein, a cutting part carried within said holder having a tip projecting through said aperture and having the longitudinal axis of said tip arranged perpendicular to the plane of said plate, means for adjusting the height of said cutting part with respect to said table, and means for heating said cutting part so that the heat produced thereby may be transmitted to said foil.

2. The apparatus according to claim 1 wherein said tip of said cutting part is substantially symmetrical with respect to its main axis.

3. The apparatus according to claim 2 where said tip of said cutting part projecting into said foil consists of diamond.

4. The apparatus according to claim 1 wherein said means for supporting said cutting tool comprises a housing, a shaft movably carried within said housing, said cutting tool being connected to one end thereof, means for axially adjusting said shaft for affecting the height of said cutting part and means connected to said housing for effecting movement of said cutting tool with respect to said plate.

5. The apparatus according to claim 4 wherein said shaft is connected to two points along its longitudinal dimension to diaphragms, each of said diaphragms being contained within said housing at their outer circumference.

6. The apparatus according to claim 1 wherein said means for heating said cutting part is electrical means.

7. The apparatus according to claim 6 wherein said electrical means for heating said cutting part comprises an electrical heating element connected to said cutting part and a source of electrical power for activating said electrical element.

8. The apparatus according to claim 1 wherein said means for heating said cutting part comprises vibrations produced ultrasonically.